US006420688B1

United States Patent
Emmerich et al.

(10) Patent No.: US 6,420,688 B1
(45) Date of Patent: Jul. 16, 2002

(54) DEVICE AND METHOD OF HEATING COMPONENTS MADE OF MICROWAVE ABSORBING PLASTIC

(75) Inventors: Rudolf Emmerich, Bruchsal; Michael Jauss, Moessingen; Armin Dommer, Ditzingen; Horst Muegge, Reichelsheim, all of (DE)

(73) Assignees: Fraunhofer Gesellschaft zur Foederung der angewandten Forschung e.V.; Muegge Electronic GmbH, both of Munich (DE)

( * ) Notice: Subject to any disclaimer, the term of this patent is extended or adjusted under 35 U.S.C. 154(b) by 0 days.

(21) Appl. No.: 09/572,519

(22) Filed: May 17, 2000

(30) Foreign Application Priority Data

May 19, 1999 (DE) .......................... 199 22 930
Aug. 12, 1999 (DE) .......................... 199 37 359

(51) Int. Cl.⁷ ................................. H05B 6/68
(52) U.S. Cl. .................... 219/710; 219/711; 219/712
(58) Field of Search ............... 219/710, 698, 219/759, 697, 748, 711, 712, 694, 702, 704; 422/90, 107–109

(56) References Cited

U.S. PATENT DOCUMENTS

| | | | |
|---|---|---|---|
| 3,975,720 A | * 8/1976 | Chen et al. | .............. 219/712 |
| 4,088,863 A | 5/1978 | Jellies | |
| 4,339,295 A | 7/1982 | Boretos et al. | |
| 4,461,941 A | * 7/1984 | Fukuda et al. | .............. 219/711 |
| 4,625,089 A | * 11/1986 | Gics | ............... 219/694 |
| 4,632,127 A | * 12/1986 | Sterzer | .............. 607/156 |
| 4,778,970 A | * 10/1988 | Klaila | .............. 219/697 |
| 5,254,824 A | 10/1993 | Chamberlain et al. | |
| 5,443,795 A | * 8/1995 | Revesz | ............... 422/90 |
| 6,211,503 B1 | * 4/2001 | Emmerich et al. | .......... 219/748 |

FOREIGN PATENT DOCUMENTS

| | | |
|---|---|---|
| DE | 32 20 070 A1 | 5/1982 |
| DE | 41 23 921 A1 | 7/1991 |
| DE | 43 12 530 A1 | 4/1993 |
| DE | 44 34 426 A1 | 9/1994 |
| EP | 0 991 136 A1 | 9/1999 |
| GB | 2 240 980 A | 1/1991 |

OTHER PUBLICATIONS

Patent Abstract of Japanese Application No. 06103783, application date May 18, 1994 entitled "Microwave Heating-Type Plastic Pipe Fusing Device" from vol. 1996 No. 3.
European Search Report dated Sep. 19, 2000 for application No. EP 00 11 0492.

* cited by examiner

Primary Examiner—Teresa Walberg
Assistant Examiner—Quang Van
(74) Attorney, Agent, or Firm—Pitney, Hardin, Kipp & Szuch LLP

(57) ABSTRACT

Device for heating components 8, 8' of a microwave-absorbing plastic material, said device incorporating a microwave generator 1 which generates microwaves of a particular frequency, an antenna 4 with at least one free end 5, 5' to which the microwaves are conducted, and an enclosure 6 surrounding and shielding the antenna 4, with a heating zone 9, 9' provided between the free end 5, 5' of the antenna 4 and the shielding enclosure 6 for the localized heating of the components 8, 8', said device featuring in the area of the heating zone 9, 9' at least one temperature sensor 11, 11' which is interactively unaffected by the microwaves and which is capable of determining the temperature of the component 8, 8' during the heating process. This device in combination with the associated process for heating components 8, 8' permits the monitoring of the temperature in the heating zone 9, 9', thus ensuring a consistent quality level of the heated components.

7 Claims, 1 Drawing Sheet

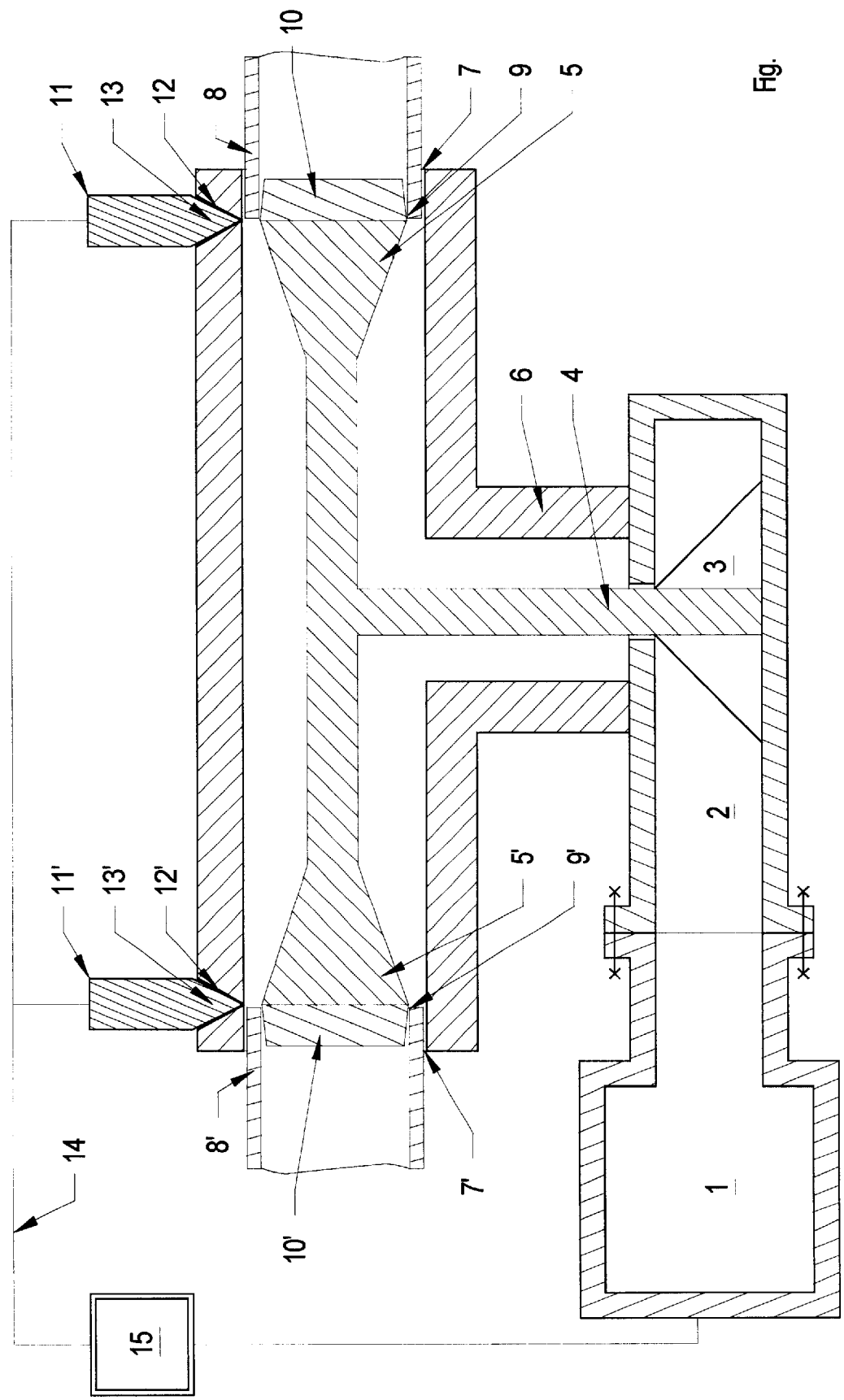

DEVICE AND METHOD OF HEATING COMPONENTS MADE OF MICROWAVE ABSORBING PLASTIC

DESCRIPTION

This invention relates to a device and to a process for heating components of a microwave-absorbing plastic material, said device incorporating a microwave generator which generates microwaves of a particular frequency, an antenna which has at least one free end to which the microwaves are guided, and an enclosure surrounding and shielding the antenna, with a heating zone provided between the said free end of the antenna and the shielding enclosure in which zone the components can be heated in localized fashion.

BACKGROUND OF THE INVENTION

In the conventional heating methods employed to date, the components are heated up by means of a heat reflector or an infrared heat source. However, heat reflectors or infrared heat sources of that type produce interference which leads to substantial measuring errors. It is for that reason that the quality of the components is not controlled directly by way of the process parameters but is instead determined indirectly by nondestructive or even destructive testing methods. These costly test procedures are employed for instance in the bonding of tubular components where the process parameters, i.e. the heat level and duration, are established on the basis of the material, the diameter and the wall thickness of the components. But such indirect determination of the process parameters complicates any systematic optimization of the bonding process since material-related and application-specific requirements cannot be considered in the equation, or inadequately at best.

SUMMARY OF THE INVENTION

An improved heating method involving the heating of the components with microwaves has been described in the as yet unpublished patent application DE 198 44 549 titled "Device and Process for Heating Microwave-Absorbing Plastic Components". That device and process offers a substantial advantage in that it is the first to permit the localized—meaning precisely defined—heating of components. It opens up an entire array of possibilities for particularly efficient and thus quicker processing in terms of bonding, bending and cross-linking. Moreover, microwave heating of components offers the advantage of instant processing without any time delay.

Building on that state of the art, it is the objective of this invention to provide both an improved design concept and an improved process for heating microwave-absorbing plastic components, ensuring in simple fashion reproducible component quality.

In terms of the device, the objective is met by a design with the features specified in claim 1. Providing the device in the area of the heating zone with at least one microwave-unaffected temperature sensor for gauging the temperature of the component during the heating process, permits continuous temperature monitoring. Such temperature monitoring in turn makes it possible to ensure consistent quality of the heated components. One important factor is the fact that, in this type of component heating device, the microwave generator does not produce any interference for the temperature sensor, meaning that neither the microwave field nor the signal picked up and transmitted by the temperature sensor is subjected to any interference. Equally important, the microwave coupling system is not a source of interference for the temperature sensor since it does not itself heat up and therefore does not affect the temperature sensor in that respect.

Of course, depending on the configuration and size of the heating zone, the device according to this invention can be equipped with several temperature sensors for providing particularly comprehensive monitoring of the component temperatures.

BRIEF DESCRIPTION OF THE DRAWINGS

FIG. 1 is a schematic illustration in cross section of a device for heating components in accordance with the invention.

DETAILED DESCRIPTION OF THE PREFERRED EMBODIMENTS

In a preferred embodiment of this invention the temperature sensor(s), non-interacting with i.e. unaffected by the microwaves, is an infrared sensor. Infrared sensors permit contact-free temperature measurements since their optical gauge is capable of determining the temperature prevailing at their focal point. This makes infrared sensors particularly suitable for use where there is limited space between the shielding enclosure and easily accessible measuring points on the component surface. Besides, infrared sensors have proved to be highly reliable, low-cost products.

In another embodiment of this invention the temperature sensor(s), unaffected by microwaves, is a fiber-optic sensor. Fiber-optic sensors are totally transparent to microwaves and they as well permit contact-free temperature determination. They are particularly useful for measuring the temperature of the component surface where the measuring points are located at a substantial distance from the shielding enclosure and/or are not easily accessible in the microwave-permeated section of the device.

Of course, it is possible to use both infrared and fiber-optic sensors in the same device, given that, depending on the geometry of the components to be heated, these sensors can complement each other rather superbly. This is true for instance in the case of tubular components which, in a localized area, must be heated to the point of plastic deformability and then shaped or bent. In this situation it is necessary to monitor the temperature within both the outer radius and the inner radius of the heated section of the tubular component. This is preferably accomplished by using an infrared sensor to monitor the temperature on the outer radius and a fiber-optic sensor to measure the temperature on the inner radius.

In principle it would be feasible, albeit substantially more complex, to use other types of temperature sensors which require contact with the component, provided such sensors do not interact with or are affected by microwaves but are transparent to microwaves.

The temperature sensor should essentially be located on the outside of the wall of the shielding enclosure. That way, the temperature sensor extends mostly on the outside of the shielding enclosure and does not protrude into the space of the device that is permeated by microwaves. This facilitates meeting the requirement whereby the temperature sensor must be unaffected by the microwaves.

When the wall of the shielding enclosure is provided with an opening that serves as a port for accommodating the optical gauge of the temperature sensor, that optical-gaugemounting port may be in the form of a cone extending from the outside to the inside of the shielding-enclosure wall. This helps prevent the formation of a gap between the wall of the shielding enclosure and the temperature sensor through which microwaves might leak in uncontrolled fashion. A cone-shaped port also permits very precise positioning of the temperature sensor which is of critical importance in terms of accurately focussing the optical gauge on a measuring point of the component surface. Obviously, optimal temperature measurements are possible only if and when the focal point of the optical gauge is precisely adjusted on the component surface.

It is also possible, however, to use other means for securing the port for the optical gauge of the temperature sensor against microwave leakage from the device, by providing absorption zones in the area of the mounting port.

In a special, enhanced implementation of this invention the temperature sensor and the controller of the microwave generator are mutually connected via at least one signal line. This not only permits the monitoring of the temperature of the component but also the control of the microwave generator as a function of the component temperature, thus providing the capability to compensate for variations in the composition of the component material.

An address-tag reference field can be stored in the controller of the microwave generator, containing the control parameters which are determined by the signal of the temperature sensor, allowing the temperature information captured by the temperature sensor to be used for the parameter-dependent control of the microwave generator.

In procedural terms, the objective of this invention is achieved using a process with the functional features specified in claim 11. While during the heating of the component at least one temperature sensor, unaffected by microwaves, measures the temperature of the component, it is possible within predetermined tolerances to maintain and record a specific temperature, thus constantly ensuring consistent component quality. This also optimizes the effective use of the microwave energy.

The microwave generator is preferably controlled as a function of the signal detected by the temperature sensor. This will also compensate for other factors which might adversely affect the bonding, shaping, bending or cross-linking of the components.

Most preferably, the microwave generator is controlled in a manner whereby the temperature of the components in the heating zone follows a specified temperature pattern. This will further optimize the efficacious use of the microwave energy.

The following explains this invention in more detail with reference to the attached drawing. The illustration shows a device for heating components of a microwave-absorbing plastic material by means of two temperature sensors, interactively unaffected by microwaves and depicted in simplified form that is not to scale.

The device incorporates a microwave generator 1 which generates microwaves at a frequency of 2.45 GHz, i.e. a wavelength of about 120 mm. A rectangular waveguide 2 directs the microwaves to a coupling unit 3 and ultimately, via the coupling unit 3, to an antenna 4 that has at least one free end 5, 5' at which they are coupled out. To prevent the antenna 4 from reflecting any microwaves into the open space, it is provided with an enclosure of tubular metal serving as a shield 6. The shielding enclosure 6 has an inner diameter of about 40 mm—meaning less than half a wavelength—and extends by at least 30 mm—one quarter wavelength—beyond the free end(s) 5, 5' of the antenna 4. In addition, the tubular shielding enclosure 6 has at least one end opening 7, 7'. Components 8, 8' to be heated and consisting of a microwave-absorbing plastic material such as polyamide, polyvinyl chloride or polyvinyl fluoride can be introduced through the end opening 7, 7' into the heating zone 9, 9' between the free end 5, 5' of the antenna 4 and the shielding enclosure 6. The dimensions of the heating zone 9, 9' depend on the size of the components 8, 8' to be heated.

The device illustrated is particularly suitable for connecting and bonding two tubular components 8, 8'. The antenna 4 extends in coaxial fashion within the tubular shielding enclosure 6 and has two flared conical free ends 5, 5'. Within an annular space the two heating zones 9, 9' between the free ends 5, 5' of the antenna 4 and the shielding enclosure 6 are particularly narrow, allowing especially high electromagnetic field intensities to be generated in these annular spaces which in turn produces a correspondingly high temperature for heating the components 8, 8'. The sections of the components 8, 8' which are located outside the heating zone 9, 9' do not heat up at all. Neither does the microwave coupling unit 3, the antenna 4 or the shielding enclosure 6.

Once the end faces of the tubular components 8, 8' have been heated to beyond the melting point, these components 8, 8' are removed from the device and bonded by pressing their molten end faces together. For optimized positioning of the tubular components 8, 8' in the device, each of the free ends 5, 5' of the antenna 4 is provided with a conical dielectric 10, 10' that matches the dimensions of the tubular components 8, 8' to be heated. The dielectric elements 10, 10' also serve to cool the inside of the tubular components 8, 8' to prevent the formation of an inward bead during the bonding process.

For ensuring a consistent quality of the welds i.e. seams of the bonded components 8, 8', the temperature of the components 8, 8' in the heating zones 9, 9' is measured with the aid of two temperature sensors 11, 11'. In the design example illustrated, these two temperature sensors 11, 11' are infrared sensors. The temperature sensors 11, 11' are essentially positioned on the outside of the wall of the shielding enclosure 6 while the tip of their respective optical gauge 13 is inserted in a port 12, 12' in the wall of the shielding enclosure 6. The mounting-port openings 12, 12' for the optical gauge 13 of the two temperature sensors 11, 11' are tapered in conical fashion from the outside toward the inside of the wall, matching the correspondingly conical optical gauge 13 of the two temperature sensors 11, 11'. The tip of the optical gauge 13 is essentially flush with the inner surface of the wall of the shielding enclosure 6, meaning that for all practical purposes it does not protrude into the microwave-permeated heating zone 9, 9' of the device. On the outside of the wall, the tapered mounting ports 12, 12' are large enough to permit easy positioning of the optical gauge 13, while on the inside of the wall they are small enough to avoid interfering with the microwave fields present in the heating zones 9, 9'. The distance of the tip of the optical gauge 13 of the two temperature sensors 11, 11' from the measuring points on the component surface is so selected that the focal length of the optical gauge 13 corresponds to that distance. In the design example illustrated, the focal length of the optical gauge, i.e. the distance, is about 2 mm.

The device for heating components 8, 8', as illustrated, is also provided with a signal line 14 between the temperature sensors 11, 11' and the controller 15 of the microwave generator 1. This permits not only the monitoring of the temperature in the heating zones 9,9' of the components 8, 8' but also the control of the microwave generator 1 as a function of the temperature in the heating zone 9, 9' of the components 8, 8'.

We claim:

1. Device for heating microwave-absorbing plastic components comprising:

a microwave generator designed to generate microwaves of a particular frequency, an antenna with at least one free end to which the microwaves are conducted, an enclosure surrounding and shielding the antenna, with a heating zone provided between the free end of the antenna and the shielding enclosure in which heating zone components can be heated in localized fashion, the shielding enclosure provided with an opening in the form of a conical port for receiving an optical gauge of a temperature sensor, and at least one temperature sensor which does not interact with the microwaves and which measures the temperature of a component as it is being heated, wherein the at least one temperature sensor includes an optical gauge and is mounted in the conical port such that the optical gauge is focused on a measuring point on a surface of a component positioned in the heating zone.

2. Device according to claim 1 wherein the at least one temperature sensor is an infrared sensor.

3. Device according to claim 1 wherein the at least one temperature sensor is a fiber-optic sensor.

4. Device according to claim 1 wherein the at least one temperature sensor is essentially positioned on an outside wall of the shielding enclosure.

5. Device according to claim 1 wherein absorption zones are provided in the area of the mounting port.

6. Device according to claim 1 wherein the at least one temperature sensor and a controller of the microwave generator are connected with each other by at least one signal line.

7. Device according to claim 6, wherein an address tag, with control parameters which are a function of a signal received from the temperature sensor, is stored in the controller of the microwave generator.

* * * * *